United States Patent
Okamoto et al.

(10) Patent No.: US 12,227,641 B2
(45) Date of Patent: *Feb. 18, 2025

(54) SOIL BIODEGRADABLE BLOWN FILM BAG FORMULATION

(71) Applicant: Green IP, LLC, Green Cove Springs, FL (US)

(72) Inventors: Kelvin T. Okamoto, Carmel, IN (US); Robert Neal Alfred Hawkinson, Green Cove Springs, FL (US)

(73) Assignee: Green IP, LLC, Green Cove Springs, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/156,235

(22) Filed: Jan. 18, 2023

(65) Prior Publication Data

US 2023/0151206 A1    May 18, 2023

Related U.S. Application Data

(63) Continuation of application No. 16/436,052, filed on Jun. 10, 2019, now Pat. No. 11,608,436.

(60) Provisional application No. 62/683,103, filed on Jun. 11, 2018.

(51) Int. Cl.

| | | |
|---|---|---|
| C08L 67/02 | (2006.01) |
| A01G 13/02 | (2006.01) |
| A47G 19/03 | (2006.01) |
| A47G 21/18 | (2006.01) |
| B29C 48/00 | (2019.01) |
| B29K 67/00 | (2006.01) |
| B65D 65/46 | (2006.01) |
| C08J 3/22 | (2006.01) |
| C08J 5/18 | (2006.01) |
| F16L 11/12 | (2006.01) |

(52) U.S. Cl.
CPC .......... *C08L 67/02* (2013.01); *A01G 13/0275* (2013.01); *A47G 19/03* (2013.01); *A47G 21/18* (2013.01); *B65D 65/466* (2013.01); *C08J 3/226* (2013.01); *C08J 5/18* (2013.01); *F16L 11/12* (2013.01); *B29C 48/022* (2019.02); *B29K 2067/04* (2013.01); *B29K 2995/006* (2013.01); *C08J 2367/02* (2013.01); *C08L 2201/06* (2013.01); *C08L 2203/14* (2013.01); *C08L 2203/162* (2013.01); *C08L 2203/18* (2013.01); *C08L 2205/06* (2013.01); *C08L 2310/00* (2013.01)

(58) Field of Classification Search
None
See application file for complete search history.

(56) References Cited

U.S. PATENT DOCUMENTS

| | | | |
|---|---|---|---|
| 2004/0138381 A1 | 7/2004 | Blasius | |
| 2005/0176881 A1 | 8/2005 | Bheda et al. | |
| 2012/0097602 A1 | 4/2012 | Tedford | |
| 2013/0087560 A1 | 4/2013 | Neuman et al. | |
| 2013/0171383 A1* | 7/2013 | Gohil | C08L 67/02 428/35.1 |
| 2015/0147929 A1 | 5/2015 | Krishnaswamy et al. | |
| 2015/0158974 A1* | 6/2015 | Chun | C08G 63/181 525/444 |
| 2018/0142073 A1 | 5/2018 | Wu | |

FOREIGN PATENT DOCUMENTS

CN             106751611 A        5/2017

OTHER PUBLICATIONS

The Extended European Search Report issued by the European Patent Office on Feb. 8, 2022 for corresponding European Patent Application No. 19818757.7; 9 pages.
Diaz, et al., "Synthesis, Properties and Applications of Biodegradable Polymers Derived from Diols and Dicarboxylic Acids: from Polyesters to Poly(ester amide)s", Journal of Molecular Sciences; Apr. 25, 2014; 60 pages.
"Polybutylene Succinate," retrieved from the internet from URL: https://en.wikipedia.org/w/index.php?title=Polybutylene_succinate&oldid=8335016; Mar. 31, 2018; 3 pages.
Gonzalez et al., "The Effect of Two Commercial Melt Strength Enhancer Additives on the Thermal, Rheological and Morphological Properties of Polylactide," Journal of Polym Eng; Jul. 30, 2019; 11 pages.
"Terephthalic Acid," retrieved from the internet from URL: https//en.wikipedia.org/wiki/Terephthalic_acid; Jul. 29, 2019; 8 pages.
The International Search Report/Written Opinion issued by the U.S. Receiving Office on Sep. 3, 2019 for corresponding International Patent Application No. PCT/US19/36294.
The First Office Action issued by the Canadian Patent Office on Mar. 25, 2022 for corresponding Canadian Patent Application No. 3,103,228; 4 pages.

(Continued)

*Primary Examiner* — Robert T Butcher
(74) *Attorney, Agent, or Firm* — SMITH, GAMBRELL & RUSSELL, LLP.

(57) ABSTRACT

A blown film of soil biodegradable aliphatic polyesters produced primarily from diacid and diol monomers. The diacid monomers may be of any type including succinic acid, adipic acid, and hexanedioic acid. The diol monomer may be of any type including ethylene glycol, propanediol, butanediol, and hexanediol. Commercial aliphatic polyesters produced from diacid and diol monomers include polybutylene succinate (PBS), polybutylene adipate succinate (PBAS), and polybutylene adipate (PBA). Comonomers may also be added. Such comonomers include chemicals with a single carboxylic acid, hydroxy, or amine moiety, which act as chain terminators, chemicals with three or more carboxylic acid, epoxy, and/or hydroxy moieties which, act as branching agents.

14 Claims, No Drawings

(56) References Cited

OTHER PUBLICATIONS

The Second Office Action issued by the Canadian Patent Office on Nov. 7, 2022 for corresponding Canadian Patent Application No. 3,103,228; 3 pages.

Nanthanananon et al., "Biodegradable polyesters reinforced with Eucalyptus Fiber: Effect of Reactive Agents", AIP Conference Proceedings; 2017; 6 pages.

The Office Action issued by the Australia Patent Office on Feb. 9, 2024 for corresponding application, Australian Patent Application No. 2019284352; 4 pages.

The Office Action issued by the Canadian Patent Office on Apr. 6, 2023 for corresponding Canadian Patent Application No. 3,103,228; 6 pages.

Nanthanananon, P., et al. "Biodegradable Polyesters Reinforced with Eucalyptus Fiber: Effect of Reactive Agent", AIP Conference Proceedings, found at https://doi.Org/10.1063/1.5016739; 2017.

EP Search Report issued by the European Patent Office on Oct. 21, 2024 for corresponding application, European Patent Appl. No. 19818757.7 6 pages.

Translation of European Search Report for European Patent Application EP19818757.7, 8 pages.

* cited by examiner

SOIL BIODEGRADABLE BLOWN FILM BAG FORMULATION

CROSS REFERENCE TO RELATED PATENT APPLICATIONS

This patent application is a continuation of application Ser. No. 16/436,052, filed Jun. 10, 2019, which claims priority from U.S. Provisional Patent Application No. 62/683,103, filed Jun. 11, 2018, which is hereby incorporated by reference.

FIELD OF THE INVENTION

This invention generally relates to an improved formulation for blown film processing of soil biodegradable film for agricultural film, bags for packaging landscaping material particularly ground cover, and other applications.

BACKGROUND OF THE INVENTION

Soil biodegradable bioplastics are typically polyesters produced from primarily aliphatic monomers, such as succinic acid, butanediol, hexanediol, and aliphatic hydroxy carboxylic acids. A small content of aromatic monomers such as terephthalic acid may also be used along with some polyfunctional monomers for branching. The more common soil biodegradable bioplastics are polybutylene succinate (PBS) and polyhydroxy alkanoate (PHA).

Examples of uses for soil biodegradable film can be found in U.S. Pat. No. 8,522,476 issued Sep. 3, 2013, U.S. Pat. No. 8,615,926 issued Dec. 31, 2013 and U.S. Pat. No. 9,445,552 issued Sep. 20, 2016.

One use of blown film is for a mulch bag that may be used as a weed barrier that then soil biodegrades over time and thus does not leave any plastic residue and does not lead to multiple layers of plastic as each layer of mulch is laid down; additionally, the weed barrier does not need to be removed and disposed of prior to laying down a new layer.

Another use of blown film is for agricultural field cover on farms or residential vegetable gardens. These films maintain moisture in the soil, prevent weeds, and with appropriate additives can do soil amendment, insect control, and other beneficial uses. An agricultural film that is soil biodegradable eliminates the need to remove and disposing of the film before tilling and planting a new crop.

Showa Denko (Japan) produced Bionolle PBS for several years using a glycidyl ether containing monomer as a chain terminator, chain extender, branching agent, and/or melt strength enhancer. This branching agent produced a PBS resin with melt strength high enough to process well in a blown film extrusion process and to provide good tear resistance in both machine and transverse directions. However, the downside to the glycidyl ether containing monomer is the difficulty to remove the unreacted monomer or to react enough of the monomer to obtain FDA indirect food additive (or direct food contact) compliance. This attribute eliminated the Bionolle PBS from a primary use for the material in food packaging which is often produced by blown film or thermoforming processing. Because of this and other reasons, Showa Denko discontinued the Bionolle product line two years ago.

Several other companies now produce PBS but none has the melt strength and properties of the Showa Denko Bionolle PBS for consistent blown film processing to produce film with acceptable tear resistance and ductility, including tensile elongation, in both machine and transverse directions in a finished film.

SUMMARY OF THE INVENTION

The present invention addresses the need to improve the blown film and thermoforming processability of soil biodegradable aliphatic polyesters produced primarily from diacid and diol monomers. The diacid monomers may be of any type including succinic acid, adipic acid, and hexanedioic acid. The diol monomer may be of any type including ethylene glycol, propanediol, butanediol, and hexanediol. Commercial aliphatic polyesters produced from diacid and diol monomers include polybutylene succinate (PBS), polybutylene adipate succinate (PBAS), and polybutylene adipate (PBA). Comonomers may also be added for branching, adding functionality or chain termination. These comonomers may be of any type but are typically less than 10% of the total monomer content. Such comonomers include chemicals with a single carboxylic acid, hydroxy, or amine moiety, which act as chain terminators, chemicals with three or more carboxylic acid, epoxy, and/or hydroxy moieties which act as branching agents. Other possible comonomers include any other chemical that will incorporate into the polymer chain backbone.

DETAILED DESCRIPTION OF THE EMBODIMENTS

As indicated, the present invention is an improved blown film of soil biodegradable aliphatic polyesters produced primarily from diacid and diol monomers. The processability of the aliphatic polyesters is improved by adding melt strength enhancers that can be oligomers or polymers. Preferred melt strength enhancers include styrene-acrylic and styrene-methacrylic copolymers or oligomers containing glycidyl groups incorporated as side chains. Several useful examples are described in the International Patent Application WO 03/066704 A1 assigned to Johnson Polymer, LLC, which is incorporated herein by reference. These materials are based on oligomers with styrene and acrylate building blocks that have desirable glycidyl groups incorporated as side chains. A high number of epoxy groups per oligomer chain is desired, at least about 10, preferably greater than about 15, and more preferably greater than about 20. These polymeric materials generally have a molecular weight greater than about 3000, preferably greater than about 4000, and more preferably greater than about 6000. These are commercially available from Johnson Polymer, LLC under the Joncryl® trade name such as Joncryl® ADR 4368. Another example copolymer is styrene-methyl methacrylate copolymerized with glycidyl methacrylate. Any melt strength enhancer or melt strength enhancer combination may be added neat or in a masterbatch with or without other additives included in the same masterbatch. Ideally, the masterbatch would use the aliphatic polyester being blended into as the carrier resin.

In another embodiment, the polymer compositions of the present disclosure can include formulations that are modified with one or more of stabilizers, plasticizers, flow promoters, polymer processing aids, slip agents, viscosity modifiers, nanoparticles, ductility modifiers, colorants, antimicrobial agents, and the like. The additional components can be added to the polymer composition at any suitable time in the manufacturing process.

Some non-limiting examples of suitable thermal stabilizers include Irganox® Antioxidant 1010, B-225, B-900, and Irgastab® FS 301 and FS 210 FF, each commercially available from BASF (Ludwigshafen, Germany). A further example of a suitable thermal stabilizer is Irganox® 168.

Some light stabilizers are commercially available from BASF under the tradenames CHIMASSORB®. Further available from BASF is Tinuvin 770 DF, which is a light stabilizer belonging to the class of hindered amine light stabilizers, as well as Tinuvin® 944, Tinuvin® 123, and Tinuvin® 328.

Any stabilizer or stabilizer combination may be added neat or in a masterbatch with or without other additives included in the same masterbatch. Ideally, the masterbatch would use the aliphatic polyester being blended into as the carrier resin.

If a color concentrate is desired, the mixture may further include one or more colorants, such as pigment(s) and/or dye(s). Organic or inorganic filler or pigment particles can be used. The pigments may be chosen from a list including clays, calcium carbonate, titanium dioxide, and synthetic organic pigments. The color concentrate may be formulated with or without other additives included in the same concentrate. Ideally, the concentrate would use the aliphatic polyester being blended into as the carrier resin. Any colorant or colorant combination may be added neat, as a liquid or dry colorant or in a masterbatch with or without other additives included. Ideally, a masterbatch would use the aliphatic polyester being blended into as the carrier resin.

Nanofillers may comprise any suitable compound. In an embodiment, the nanofiller comprises an organoclay. Some non-limiting examples of suitable organoclay materials include Cloisite® Na+, Cloisite® 30B, Cloisite® 10A, Cloisite® 25A, Cloisite® 93A, Cloisite® 15A, Cloisite® 20A. The Coisite clays are proprietary nanoclays commercially available from Southern Clay Products, a subsidiary of Rockwood Specialties, Inc. (Princeton, N.J.). Suitable organoclay may also be obtained from Nanocor, a subsidiary of Minerals Technologies, Inc. (Bethlehem, PA). Nanofillers may be added neat or in a masterbatch with or without other additives included in the same masterbatch. Ideally, the masterbatch would use the aliphatic polyester being blended into as the carrier resin. Adding nanofillers neat may require compounding or mixing the nanofillers in was two passes through the compounder or mixer to get full dispersion.

The anti-microbial agents can be metal-based agents such as zinc oxide, copper and copper compounds, silver and silver compounds, colloidal silver, silver nitrate, silver sulphate, silver chloride, silver complexes, metal-containing zeolites, surface-modified metal-containing zeolites, or combinations thereof. The metal-containing zeolites can comprise a metal such as silver, copper, zinc, mercury, tin, lead, bismuth, cadmium, chromium, cobalt, nickel, zirconium, and combinations thereof. In another embodiment, the anti-microbial agents can be organic-based agents such as o-benzyl-phenol, 2-benzyl-4-chloro-phenol, 2,4,4'-trichloro-2'-hydroxydiphenyl ether, 4,4'-dichloro-2-hydroxydiphenyl ether, 5-chloro-2-hydroxy-diphenyl-methane, mono-chloro-o-benzyl-phenol, 2,2'-methylenbis-(4-chloro-phenol), 2,4,6-trichlorophenol, and combinations thereof. Any anti-microbial agent or anti-microbial agent combination may be added neat or in a masterbatch with or without other additives included in the same masterbatch. Ideally, the masterbatch would use the aliphatic polyester being blended into as the carrier resin.

Slip agents can be any one or more of additives known to reduce static or make it easier to separate to layers of film; known slip agents include, but are not limited to, talc, calcium carbonate, erucamide, and zinc stearate. Any slip agent or slip agent combination may be added neat or in a masterbatch with or without other additives included in the same masterbatch. Ideally, the masterbatch would use the aliphatic polyester being blended into as the carrier resin.

The plasticizers can be, for example, any suitable material that softens and/or adds flexibility to the materials they are added to. The plasticizers can soften the final product increasing its flexibility. Non-limiting examples of the plasticizers include, for example, polyethylene glycol, sorbitol, glycerine, soybean oil, castor oil, TWEEN 20, TWEEN 40, TWEEN 60, TWEEN 80, TWEEN 85, sorbitan monolaurate, sorbitan monooleate, sorbitan monopalmitate, sorbitan trioleate, sorbitan monostearate, PEG, derivatives of PEG, N,N-ethylene bis-stearamide, N,N-ethylene bis-oleamide, tributyl o-acetyl citrate, Hallstar Hallcoaid PA-6D, polycarprolactone, polymeric plasticizers such as poly(1,6-hexamethylene adipate), or combinations thereof.

The higher strength or more ductile aliphatic polyester material can be converted into articles by any suitable process such as, for example, foam extrusion and molding, injection molding, thermoforming, blown film, film extrusion, stretch blow molding, extrusion blow molding, extrusion coatings, profile extrusion, cast films, cast products, or combinations thereof. Sheet extrusion includes cast sheet as well as sheet produced by uniaxial and biaxial orientation. Blown film processing includes both processes typically used for low density polyethylene and used for high density polyethylene, i.e. from not too low to medium to high stalk.

Articles that can be produced from the inventive composition include, for example, films, trash bags, grocery bags, container sealing films, pipes, drinking straws, and sheets. The sheet can be further processed to produce articles such as cups, plates, and other objects, including those used outside of the food service industry.

Specifically, the higher strength or more ductile aliphatic polyester can be converted into a film to produce a bag for mulches, such as pine straw, chipped wood bark, grain straws, shredded wood materials, or other mulches known to those of ordinary skill in the landscaping art. The ground cover may also include rock, including sand, crushed stone, gravel, pea gravel, graded stone, shale, or other rock materials known to those of ordinary skill in the landscaping art. The ground cover may also include ground synthetic particles, such as ground rubber particles and ground plastic particles. The ground cover may also include composted soil. The higher strength or more ductile aliphatic polyester may also be converted into weed block film, agricultural film, and other applications desiring soil and water biodegradability as a property.

The converted film may be further modified by being perforated, microperforated, sealed, or printed or by any other known method for modifying film.

By way of example and not limitation, the following examples are illustrative of various embodiments of the present invention.

TABLE 1

Material Composition

| MATERIALS Blend #1 | QTY (lbs) |
|---|---|
| Polybutylene Succinate | 96 |
| Color Masterbatch in PBS | 3 |
| Melt Strength Enhancer Masterbatch in PBS | 1 |

For this example, all the blend components were added separately to the feed throat of a 65 mm diameter single screw extruder using a temperature profile of between 160° C. and 180° C. The material was blown into a 70 mm lay flat film using a 127 mm diameter blown film die. As an alternative, the material composition can first be compounded in an appropriate single-screw extruder, twin-screw extruder, continuous mixer (e.g., Farrel continuous mixers), or batch mixers (e.g., Banbury mixers), and then the compounded resin can be added neat or with additional additives to the feed throat of a blown film extruder.

TABLE 2

Formulation ranges of the Aliphatic Polyester Composition in an embodiment

|  | General Range (by weight) | Preferred (by weight) | Most Preferred (by weight) |
|---|---|---|---|
| Aliphatic Polyester | 53-99.89% | 64.5-94.8% | 71-89.7% |
| Melt Strength Enhancer | 0.1-1.0% | 0.15-0.75% | 0.2-0.5% |
| Color Masterbatch | 0-5% | 0-4% | 0-3% |
| Antioxidant | 0.01-1.0% | 0.05-0.75% | 0.1-0.5% |
| Ductility Modifier (Plasticizer) | 0-40% | 5-30% | 10-25% |

TABLE 3

| % Loading | Control | Example 1 | Example 2 | Example 3 |
|---|---|---|---|---|
| PBS | 100 | 91 | 70.75 | 70.75 |
| 25% MSE in PBS |  | 1 | 1 | 1 |
| 10% Slip in PBS |  | 2.5 | 2.5 | 2.5 |
| 10% Antioxidant in PBS |  | 2.5 | 2.5 | 2.5 |
| 30% Color in PBS |  | 3 | 3 | 3 |
| Plasticizer 1 |  |  | 15 | 10 |
| Plasticizer 2 |  |  | 5 | 10 |
| Plasticizer 3 |  |  | 0.25 | 0.25 |

TABLE 4

|  | Control | | Example 1 | | Example 2 | | Example 3 | |
|---|---|---|---|---|---|---|---|---|
| Sample ID | MD | TD | MD | TD | MD | TD | MD | TD |
| Tensile @ Max (psi) | | | | | | | | |
| Thickness Ave (mils) | 2.44 | 2.82 | 3.19 | 3.19 | 2.46 | 2.40 | 2.63 | 2.30 |
| Ave | 5335 | 5047 | 5300 | 5332 | 5136 | 3674 | 5918 | 5300 |
| Std Dev | 536 | 332 | 196 | 141 | 374 | 375 | 363 | 303 |
| Elongation @ Max (%) | | | | | | | | |
| Ave | 18 | 13 | 14 | 13 | 598 | 409 | 647 | 563 |
| Std Dev | 3 | 2 | 3 | 1 | 52 | 48 | 23 | 41 |
| Tensile @ Break (psi) | | | | | | | | |
| Ave | 3457 | 4795 | 4746 | 5332 | 5136 | 3666 | 5918 | 4766 |
| Std Dev | 1445 | 840 | 748 | 141 | 374 | 375 | 363 | 872 |
| Elongation @ Break (%) | | | | | | | | |
| Ave | 311 | 13 | 16 | 13 | 598 | 409 | 647 | 564 |
| Std Dev | 46 | 2 | 1 | 1 | 52 | 48 | 23 | 41 |

For this example, all the blend components were added separately to the feed throat of a CPeX Farrel Continuous Mixer using a temperature profile of between 160° C. and 180° C. and turned into pellets using an underwater pelletizer. The resulting pellets were then turned into film using a lab blown film line with a lay flat 4 to 6" wide. As an alternative, the material composition can first be compounded in an appropriate single-screw extruder, twin-screw extruder, or batch mixers (e.g., Banbury mixers) and then the compounded resin can be added neat or with additional additives to the feed throat of a blown film extruder.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

While this invention has been described with reference to preferred embodiments thereof, it is to be understood that variations and modifications can be affected within the spirit and scope of the invention as described herein and as described in the appended claims.

We claim:

1. A polymer composition for blown film processing comprising:
   at least one biodegradable aliphatic polyester produced from diacids selected from the group consisting of adipic acid and succinic acid and combinations thereof and diol monomers selected from the group consisting of ethylene glycol, propanediol, butanediol, and hexanediol; and
   an effective amount of melt strength enhancer,
wherein the effective amount of melt strength enhancer ranges from about 0.1% to about 1.0% by weight and wherein the melt strength enhancer is styrene-acrylic, styrene-methacrylic copolymers or oligomers containing glycidyl groups incorporated as side chains.

2. The polymer composition of claim 1, wherein the melt strength enhancer ranges from about 0.15% to about 0.75% by weight.

3. The polymer composition of claim 1, wherein the at least one biodegradable aliphatic polyester contains comonomers with three of more functionalities.

4. The polymer composition of claim 1 further comprising at least one component selected from the group consisting of plasticizers, flow promoters, polymer processing aids, slip agents, viscosity modifiers, chain extenders, nanoparticles, colorants, anti-microbial agents, and combinations thereof.

5. The polymer composition of claim 4, wherein the plasticizer is selected from a group consisting of polyethylene glycol, sorbitol, glycerine, soybean oil, castor oil, polyoxyethylene (20) sorbitan monolaurate, polyoxyethylene (20) sorbitan monopalmitate, polyethylene glycol sorbitan monostearate, polyoxyethylene (20) sorbitan monooleate, polyoxyethylene sorbitan trioleate, sorbitan monolaurate, sorbitan monooleate, sorbitan monopalmitate, sorbitan trioleate, sorbitan monostearate, N,N-ethylene bis-stearamide, N,N-ethylene bis-oleamide, citrate esters, polymeric plasticizers, poly(1,6-hexamethylene adipate), and combinations thereof.

6. The polymer composition of claim 5, wherein the total plasticizer composition is less than 40% by weight.

7. The polymer composition of claim 5, wherein the total plasticizer composition is 5 to 30% by weight.

8. The polymer composition of claim 5, wherein the total plasticizer composition is 10 to 25% by weight.

9. The polymer composition of claim 1, where the at least one biodegradable polymer composition is soil and water biodegradable.

10. The polymer composition of claim 1, wherein the polymer composition is produced using twin-screw extrusion, single-screw extrusion, batch mixing, or continuous mixing equipment.

11. A biodegradable article comprising a polymer composition according to claim 1.

12. The biodegradable article of claim 11, wherein the article is selected from the group consisting of mulch bags, weed block film and agricultural film.

13. The polymer composition of claim 1 further comprising an effective amount of a plasticizer sufficient to increase elongation break in the transverse and machine directions of a blown film.

14. The polymer composition of claim 1, wherein the melt strength enhancer is styrene-methyl methacrylate copolymerized with glycidyl methacrylate.

* * * * *